Patented Jan. 5, 1926.

1,568,186

UNITED STATES PATENT OFFICE.

ISAAC M. SCOTT AND SAMUEL PEACOCK, OF WHEELING, WEST VIRGINIA.

PROCESS FOR DEPHOSPHORIZING IRON AND STEEL.

No Drawing.   Application filed March 7, 1925.   Serial No. 13,849.

*To all whom it may concern:*

Be it known that we, ISAAC M. SCOTT and SAMUEL PEACOCK, citizens of the United States, residing at Wheeling, in the county of Ohio and State of West Virginia, have invented certain new and useful Improvements in Processes for Dephosphorizing Iron and Steel; and we do hereby declare the following to be a full, clear, and exact description of the invention, such as will enable others skilled in the art to which it appertains to make and use the same.

This invention relates to a process for dephosphorizing iron and steel in a basic open hearth furnace, and has for its object to improve the procedures heretofore proposed.

With this and other objects in view, the invention consists in the novel steps and combinations of steps constituting the process, all as will be more fully hereinafter disclosed and particularly pointed out in the claims.

In order that the invention may be the more clearly understood, its is said:— It is well known that in the production of basic iron and steel there is provided a molten bath of the metal to be dephosphorized on top of which floats a mass of basic slag. Such slag usually contains between two and three times as much calcium and magnesium oxides as it does silica $SiO_2$; and said slag also usually contains from four to eight percent of combined manganese. In the prior procedures the iron phosphides in the molten bath are usually converted into calcium or magnesium phosphides substantially in accordance with the following equations:—

(*a*)  $2Fe_3P + 3CaO = 3Fe + 3FeO + Ca_3P_2$ (*b*)  $2Fe_3P + 3MgO = 3Fe + 3FeO + Mg_3P_2$

It is further well known that the atmosphere of the furnace is usually strongly oxidizing in its action, and that therefore the manganese present in the slag is subjected to powerful oxidizing conditions. It is also well known that calcium and magnesium manganates are constantly being formed and dissociated since the temperature is usually maintained above 1600° C. The manganates thus momentarily formed serve to effect the oxidation in the slag of the phosphides to phosphates substantially in accordance with the principles of the following equation:—

(*c*)  $Ca_3P_2 + 4CaMnO_4 =$
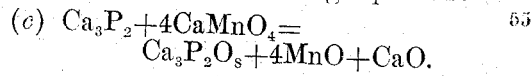

The calcium phosphate, $Ca_3P_2O_8$ thus formed, not being capable of reduction under the conditions stated, remains in the slag.

The process of this invention, on the other hand, proceeds as follows:— Instead of using calcium oxide to accomplish the above-mentioned dephosphorizing effect, an oxygen bearing chromium compound is employed either alone or associated with combined manganese. By this invention, therefore, a calcium or a magnesium oxide or chromate, or both may be employed and each of these are capable of oxidizing phosphides to phosphates, as is illustrated in the following equation when calcium chromate is used:—

(*d*)  $3Ca_3P_2 + 16CaCrO_4 =$
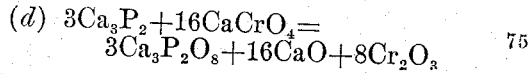

The advantage in using calcium chromate to oxidize calcium phosphides to the phosphate form instead of calcium manganate, consists in the greater stability of the chromate at temperature of the slag and in consequence a longer period of contact with the slag may be had before said chromate suffers dissociation. In addition, the chromium in the finally discarded slag is usually present in the form of an alkaline earth chromate and by fine grinding of the same and digestion with solutions of alkali metal salts, such as sodium sulphate, the chromium is readily recoverable as a sodium chromate.

In practice, the process is carried out by adding a chrome bearing iron ore to the bath precisely as iron ore is employed in decarburizing molten pig iron in a basic open hearth process. It has been found that a small percentage of elemental chromium is produced in this procedure which dissolves in the metal bath; and that the dephosphorization is more complete than when combined manganese only is employed for dephosphorizing. The recovery of the chromium from the discarded slag contributes very materially to the economy of the entire procedure, for it has not been found in practice that the use of oxygen bearing chromium compounds in carrying out the dephosphorizing procedure in the manner above disclosed adds to the fuel required to produce a given tonnage of steel, while the chromium recovered is in the form of a chromate, which has an important commercial value and which is produced without any substantial expenditure of energy in so far as the conversion of chromic oxide, $Cr_2O_3$, to chromic anhydride, $CrO_3$, is concerned.

It will now be clear that by substituting and adding to a molten mass of the metal chromic oxide such as $Cr_2O_3$, or a chromate instead of manganese oxide, $Mn_2O_3$, in the process of dephosphorizing molten iron in the basic open hearth process, one is enabled to more completely and to more rapidly dephosphorize said iron and at the same time to recover from the slag the dephosphorizing agent in a form more valuable than that in which it was original employed. Of course, when a manganese oxygen carrying compound is employed with the chromium compound, only enough of the two compounds when taken together need be employed to effectively dephosphorize the iron phosphides present, but if only a chromium compound is employed, enough of the latter when taken alone is used to dephosphorize all of the iron phosphide present.

What is claimed is:

1. The process of dephosphorizing iron and steel in a basic open hearth process which consists in providing a molten mass of the metal to be dephosphorized; and adding to said mass a quantity of oxygen carrying compounds containing combined chromium sufficient to dephosphorize a substantial portion of the iron phosphide present in said mass.

2. The process of dephosphorizing iron and steel in a basic open hearth process which consists in providing a molten mass of the metal to be treated; and adding to said mass a quantity of oxygen carrying compounds containing combined chromium sufficient to dephosphorize substantially all of the iron phosphide present in said mass.

3. The process of dephosphorizing iron and steel in a basic open hearth process which consists in providing a molten mass of the metal to be treated; and adding to said mass a quantity of oxygen carrying compounds containing combined chromium in the form of a chromate sufficient to dephosphorize substantially all of the iron phosphide present in said mass.

4. The process of dephosphorizing iron and steel in a basic open hearth process which consists in providing a molten mass of the metal to be dephosphorized; and adding to said mass a quantity of oxygen carrying compounds containing combined chromium in the form of a chromate sufficient to dephosphorize a substantial portion of the iron phosphides present in said mass.

In testimony whereof, we affix our signatures.

ISAAC M. SCOTT.
SAMUEL PEACOCK.